United States Patent
Li

(10) Patent No.: US 12,181,001 B2
(45) Date of Patent: Dec. 31, 2024

(54) PLASTIC BEARING FOR STEERING COLUMN

(71) Applicant: C&U COMPANY LIMITED., WenZhou (CN)

(72) Inventor: Xinwang Li, WenZhou (CN)

(73) Assignee: C&U COMPANY LIMITED., Wenzhou (CN)

( * ) Notice: Subject to any disclaimer, the term of this patent is extended or adjusted under 35 U.S.C. 154(b) by 0 days.

(21) Appl. No.: 17/914,762

(22) PCT Filed: Sep. 16, 2021

(86) PCT No.: PCT/CN2021/118714
§ 371 (c)(1),
(2) Date: Sep. 27, 2022

(87) PCT Pub. No.: WO2022/267241
PCT Pub. Date: Dec. 29, 2022

(65) Prior Publication Data
US 2024/0246599 A1      Jul. 25, 2024

(30) Foreign Application Priority Data

Jun. 23, 2021   (CN) ........................ 202110697163.X

(51) Int. Cl.
*F16C 33/62*   (2006.01)
*B62D 1/16*   (2006.01)
(Continued)

(52) U.S. Cl.
CPC .............. *F16C 35/067* (2013.01); *B62D 1/16* (2013.01); *F16C 19/163* (2013.01);
(Continued)

(58) Field of Classification Search
CPC ...... F16C 19/16; F16C 19/163; F16C 33/583; F16C 33/586; F16C 35/06; F16C 35/0635;
(Continued)

(56) References Cited

U.S. PATENT DOCUMENTS 5,531,526 A * 7/1996 Labedan ............... F16C 35/077
384/536
2019/0032706 A1* 1/2019 Isaji ..................... H02K 5/1732
(Continued)

FOREIGN PATENT DOCUMENTS

CN     201944116 U    8/2011
CN     203906549 U    10/2014
(Continued)

*Primary Examiner* — Alan B Waits
(74) *Attorney, Agent, or Firm* — Bayramoglu Law Offices LLC

(57) ABSTRACT

A plastic bearing for a steering column includes a housing, an inner race, and a middle race. A retainer and balls are arranged between the middle race and the inner race. An accommodating cavity is formed in the housing; the middle race is arranged in the accommodating cavity. Guide protrusions are arranged on an inner wall of the accommodating cavity. Two positioning protrusions are arranged on an outer wall of the middle race, and an insertion groove is formed between the two positioning protrusions. The guide protrusion is matched with the insertion groove. Buckles are arranged on the inner wall of the accommodating cavity. Clamping blocks are arranged on the outer wall of the middle race, and the clamping blocks are clamped in the buckles. The overall structure of the plastic bearing for a steering column is more compact and simple and can be easily and conveniently assembled.

20 Claims, 3 Drawing Sheets

(51) Int. Cl.
*F16C 19/16* (2006.01)
*F16C 33/41* (2006.01)
*F16C 33/58* (2006.01)
*F16C 35/06* (2006.01)
*F16C 35/067* (2006.01)
*F16C 33/80* (2006.01)

(52) U.S. Cl.
CPC .......... *F16C 33/412* (2013.01); *F16C 33/586* (2013.01); *F16C 33/62* (2013.01); *F16C 33/80* (2013.01); *F16C 2326/24* (2013.01)

(58) Field of Classification Search
CPC ...... F16C 35/067; F16C 35/07; F16C 35/073; F16C 35/077; F16C 43/04; F16C 2326/24; B62D 1/16–20
See application file for complete search history.

(56) References Cited

U.S. PATENT DOCUMENTS

| | | | |
|---|---|---|---|
| 2019/0301535 A1* | 10/2019 | Mayr | F16C 35/077 |
| 2022/0389969 A1* | 12/2022 | Barthelme | F16C 35/06 |
| 2023/0235788 A1* | 7/2023 | Barthelme | F16C 35/077 384/513 |
| 2023/0249741 A1* | 8/2023 | Illes et al. | F16C 27/04 180/444 |

FOREIGN PATENT DOCUMENTS

| | | |
|---|---|---|
| CN | 205769535 U | 12/2016 |
| CN | 208010786 U | 10/2018 |
| CN | 113389809 A | 9/2021 |
| DE | 102016013467 A1 | 5/2018 |

\* cited by examiner

PLASTIC BEARING FOR STEERING COLUMN

CROSS-REFERENCE TO RELATED APPLICATIONS

This application is the national phase entry of International Application No. PCT/CN2021/118714, filed on Sep. 16, 2021, which is based upon and claims priority to Chinese Patent Application No. 202110697163.X, filed on Jun. 23, 2021, the entire contents of which are incorporated herein by reference.

TECHNICAL FIELD

The present disclosure relates to the technical field of bearings and, in particular, to a plastic bearing for a steering column.

BACKGROUND

At present, common steering columns of automobiles adopt ordinary ball bearings, which are mostly thin-walled. During operation, existing bearings for steering columns of automobiles have a low rotational speed, which is about 100 rpm in general, and have low bearing capacity. The bearings are subjected to both axial loads and radial loads in the operating environment whose temperature is not high, generally between −40° C. and 80° C. With the current development of the automobile industry, special bearings, such as bearings that are lightweight, self-lubricating, and self-aligning, are increasingly needed. The existing ordinary ball bearings are not lightweight, self-lubricating, or self-aligning and cannot be conveniently assembled, thus being incapable of improving the overall structure's use effect and efficiency.

SUMMARY

The objective of the present disclosure is to overcome the shortcomings of the prior art by providing a plastic bearing for a steering column. The overall structure of the plastic bearing for a steering column is more compact and simple and can be easily and conveniently assembled.

To achieve the above objective, the present disclosure provides a plastic bearing for a steering column. The plastic bearing for a steering column includes a housing, an inner race, and a middle race, where the middle race is sleeved outside the inner race. A retainer and balls rotatably mounted on the retainer are arranged between the middle race and the inner race. The housing, the inner race, and the middle race are all made of plastic. An accommodating cavity is formed in the housing; the middle race is arranged in the accommodating cavity. A plurality of guide protrusions is arranged on an inner wall of the accommodating cavity. Two positioning protrusions corresponding to two sides of each guide protrusion are arranged on an outer wall of the middle race, and an insertion groove is formed between the two positioning protrusions. The guide protrusion is matched with the insertion groove in an insertion manner. A plurality of buckles is arranged on the inner wall forming the accommodating cavity. Clamping blocks corresponding to the buckles are arranged on the outer wall of the middle race, and the clamping blocks are clamped onto the buckles such that the housing and the middle race are fixed together.

Such configuration has the following beneficial effects of the overall structure being compact, thus saving space. During assembly, the retainer and the ball are mounted onto the middle race, and then the middle race is sleeved outside the inner race, such that the middle race and the inner race are rotatably connected. Afterward, based on the match between the guide protrusion and the insertion groove, the middle race is put into the accommodating cavity of the housing, and in this process, the clamping block is clamped onto the buckle, such that the middle race is fixed to the housing. In this way, the ease of assembly and simplification of the assembly procedure are achieved. Meanwhile, the whole bearing except for the ball is made of plastic, such that a lightweight bearing is realized. The whole bearing being almost completely made of plastic can be self-lubricated without excessive lubricating oil, thus reducing costs and pollution to the environment. The plastic can be processed by injection molding, such that high processing efficiency is achieved, and the grinding process can be replaced. Additionally, the structure is simple and can be easily assembled, and the assembly efficiency of the overall structure is improved.

Further, a convex block is arranged on a side of the buckle that is facing the clamping block.

Further, a surface of the convex block brought into contact with the clamping block is inclined, and a surface of the clamping block brought into contact with an outer edge of the accommodating cavity is inclined.

Such configuration has the following beneficial effects of the clamping block being clamped onto the buckle more smoothly, such that the assembly efficiency is improved.

Further, positioning ribs corresponding to two sides of the positioning protrusions are arranged on the inner wall of the accommodating cavity.

Further, the positioning rib and the positioning protrusion are both formed in a wedge shape.

Further, an outer wall of the positioning rib is attached to an outer wall of the positioning protrusion.

Such configuration has the following beneficial effects of a better assembly guidance effect being achieved, and the structure is simple and extremely stable.

Further, a positioning flange is arranged on the bottom surface of the accommodating cavity. A dust-proof groove corresponding to the positioning flange is formed in the end face of the inner race. The positioning flange is clamped into the dust-proof groove.

Further, the positioning flange is in a clearance fit with the dust-proof groove.

Such configuration has the following beneficial effects: A labyrinth structure is formed by the combination of the dust-proof groove and the positioning flange, such that foreign matters are prevented from falling into the bearing, and the stability in the use of the overall structure is achieved. Meanwhile, the structure is simple and can be easily assembled, and the weight of the overall structure is effectively reduced, such that the requirement for a lightweight bearing is met. Additionally, based on the clearance fit between the positioning flange and the dust-proof groove, the positioning flange is clamped into the dust-proof groove more easily, such that the assembly is smoother and more convenient.

Further, a plurality of assembly ribs is circumferentially arranged on an outer wall of the housing, and a guide rib for assembly guidance is also arranged on the outer wall of the housing.

Such configuration has the following beneficial effects: By using the assembly ribs, a pressing force applied to the housing is not likely to be excessively large. Meanwhile, the structure is simple and can be easily assembled, and the convenience for production and processing is achieved.

Further, an inner radial surface of the inner race is special-shaped.

Such configuration has the following beneficial effects: A pressing force from a shaft is not likely to be excessively large, such that the stability and use effect of the overall structure are guaranteed. Meanwhile, the structure is simple, and the convenience of processing is achieved.

DETAILED DESCRIPTION OF THE EMBODIMENTS

Figure 1:
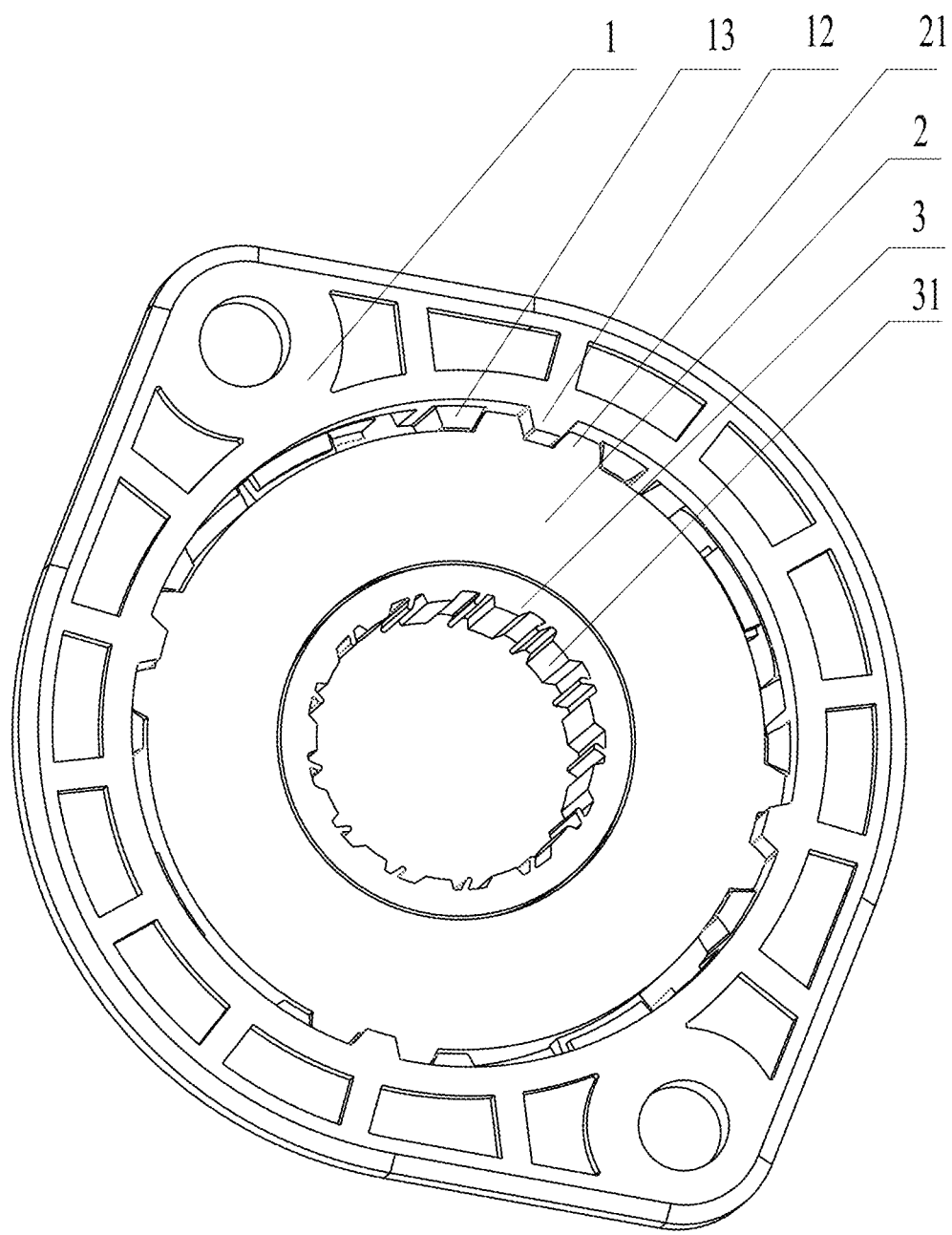
FIG. 1 is a structural diagram of a plastic bearing for a steering column in an embodiment of the present disclosure.
Figure 2:
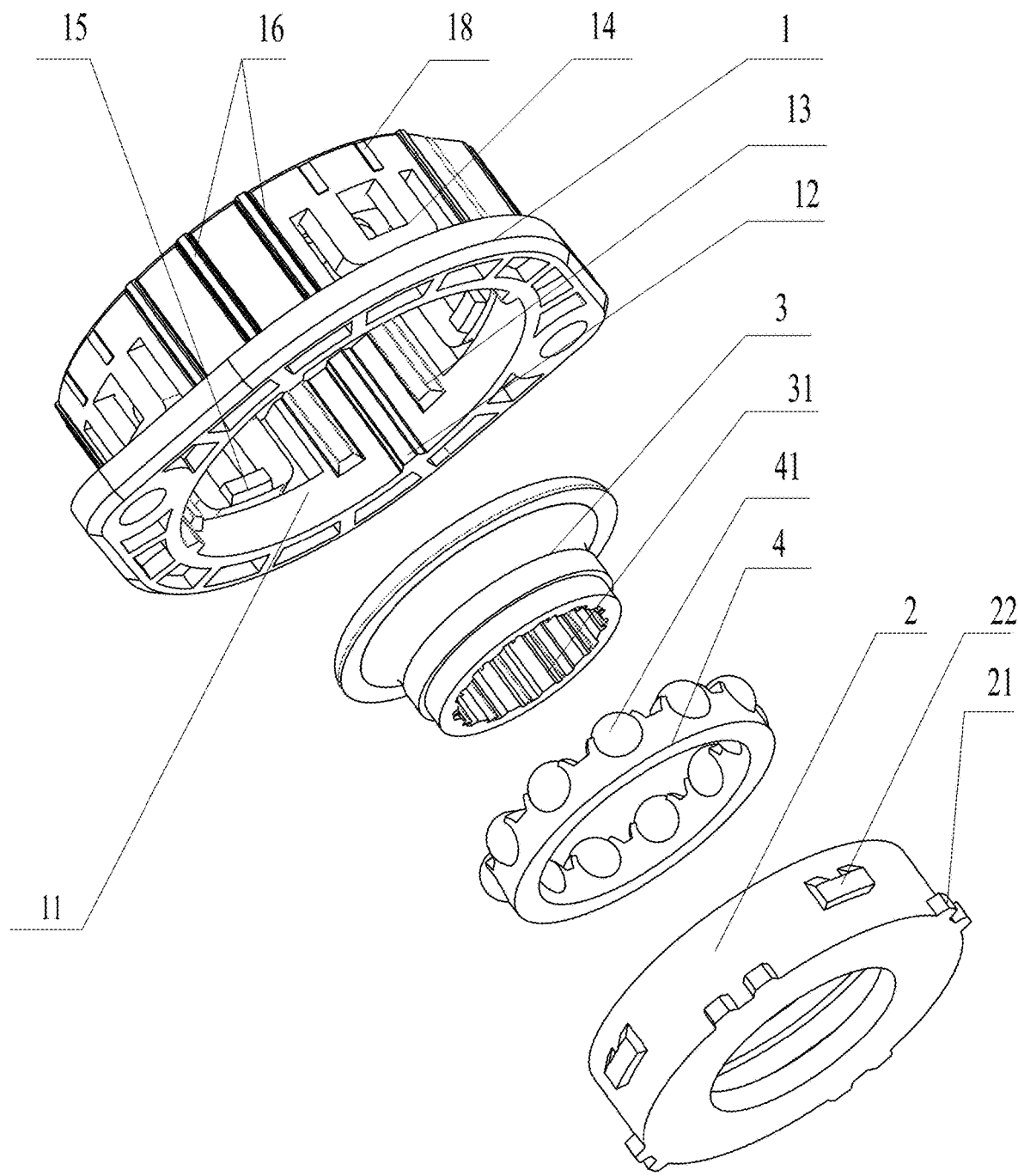
FIG. 2 is an exploded structural diagram of the plastic bearing for a steering column in the embodiment of the present disclosure.
Figure 3:
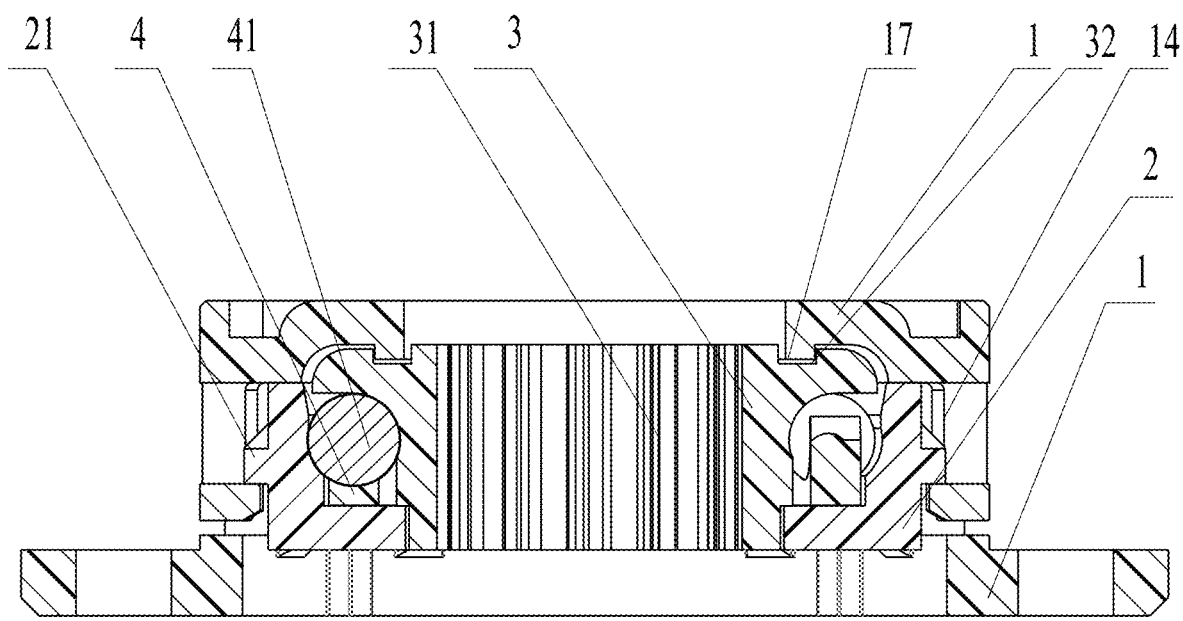
FIG. 3 is a sectional structural diagram of the plastic bearing for a steering column in the embodiment of the present disclosure.

As shown in FIG. 1 to FIG. 3, a plastic bearing for a steering column in embodiment 1 of the present disclosure includes a housing (1), an inner race (3), and a middle race (2), where the middle race (2) is sleeved outside the inner race (3). A retainer (4) and balls (41) rotatably mounted on the retainer (4) are arranged between the middle race (2) and the inner race (3). The housing (1), the inner race (3), and the middle race (2) are all made of plastic. An accommodating cavity (11) is formed in the housing (1); the middle race (2) is arranged in the accommodating cavity (11). A plurality of guide protrusions (12) is arranged on an inner wall of the accommodating cavity (11); two positioning protrusions (21) corresponding to two sides of each guide protrusion (12) are arranged on an outer wall of the middle race (2), and an insertion groove is formed between the two positioning protrusions (21). The guide protrusion (12) is matched with the insertion groove in an insertion manner. Four buckles (14) are arranged on the inner wall of the accommodating cavity (11) and located at positions respectively corresponding to angles of 0°, 90°, 180°, and 270° around a circle. Clamping blocks (22) corresponding to the buckles (14) are arranged on the outer wall of the middle race (2), and the clamping blocks (22) are clamped onto the buckles (14), such that the housing (1) and the middle race (2) are fixed together. Such configuration has the following beneficial effects: The overall structure is compact, thus saving space. During assembly, the retainer (4) and the ball (41) are mounted onto the middle race (2), and then the middle race (2) is sleeved outside the inner race (3), such that the middle race (2) and the inner race (3) are rotatably connected. Afterward, based on the match between the guide protrusion (12) and the insertion groove, the middle race (2) is put into the accommodating cavity (11) of the housing (1), and in this process, the clamping block (22) is clamped onto the buckle (14), such that the middle race (2) is fixed to the housing (1). In this way, the ease of assembly and simplification of the assembly procedure are achieved. Meanwhile, the whole bearing except for the ball (41) is made of plastic, such that a lightweight bearing is realized. Being almost completely made of plastic, the whole bearing can be self-lubricated without excessive lubricating oil, thus reducing the cost and pollution to the environment. The plastic can be processed by injection molding, such that high processing efficiency is achieved, and the grinding processing can be replaced. Additionally, the structure is simple and can be easily assembled, and the assembly efficiency of the overall structure is improved.

Further, a convex block (15) is arranged on a side of the buckle (14) facing the clamping block (22). A surface of the convex block (15) that is brought into contact with the clamping block (22) is inclined. A surface of the clamping block (22) that is brought into contact with an outer edge of the accommodating cavity (11) is inclined. Such configuration has the following beneficial effects: The clamping block (22) is clamped onto the buckle (14) more smoothly, such that the assembly efficiency is improved.

Further, positioning ribs (13) corresponding to two sides of the positioning protrusions (21) are arranged on the inner wall of the accommodating cavity (11). The positioning rib (13) and the positioning protrusion (21) are both formed in a wedge shape, and an outer wall of the positioning rib (13) is attached to an outer wall of the positioning protrusion (21). Such configuration has the following beneficial effects: A better assembly guidance effect is achieved, and the structure is simple and extremely stable.

Further, a positioning flange (17) is arranged on the bottom surface of the accommodating cavity (11). A dust-proof groove (32) corresponding to the positioning flange (17) is formed in an end face of the inner race (3), and the positioning flange (17) is clamped into the dust-proof groove (32). Further, the positioning flange (17) is in a clearance fit with the dust-proof groove (32). Such configuration has the following beneficial effects: A labyrinth structure is formed by the combination of the dust-proof groove (32) and the positioning flange (17), such that foreign matters are prevented from falling into the bearing, and the stability in the use of the overall structure is achieved. Meanwhile, the structure is simple and can be easily assembled, and the weight of the overall structure is effectively reduced, such that the requirement for a lightweight structure is met. Additionally, based on the clearance fit between the positioning flange (17) and the dust-proof groove (32), the positioning flange (17) is clamped into the dust-proof groove (32) more easily, such that the assembly is smoother and more convenient.

Further, a plurality of assembly ribs (16) are circumferentially arranged on an outer wall of the housing (1), and a guide rib (18) for assembly guidance is also arranged on the outer wall of the housing (1). Such configuration has the following beneficial effects: By using the assembly ribs (16), a pressing force applied to the housing is not likely to be excessively large. Meanwhile, the structure is simple and can be easily assembled, and the convenience of production and processing is achieved.

Further, an inner radial surface of the inner race (3) is special-shaped. Such configuration has the following beneficial effects: The pressing force from a shaft is not likely to be excessively large, such that the stability and use effect of the overall structure are guaranteed. Meanwhile, the structure is simple, and the convenience for the processing is achieved.

As shown in FIG. 1 to FIG. 3, a plastic bearing for a steering column in embodiment 2 of the present disclosure includes a housing (1), an inner race (3), and a middle race (2), where the middle race (2) is sleeved outside the inner race (3); a retainer (4) and balls (41) rotatably mounted on the retainer (4) are arranged between the middle race (2) and the inner race (3). The housing (1), the inner race (3), and the middle race (2) are all made of plastic. An accommodating cavity (11) is formed in the housing (1); the middle race (2)

is arranged in the accommodating cavity (11). A plurality of guide protrusions (12) are arranged on an inner wall of the accommodating cavity (11); two positioning protrusions (21) corresponding to two sides of each guide protrusion (12) are arranged on an outer wall of the middle race (2), and an insertion groove is formed between the two positioning protrusions (21). The guide protrusion (12) is matched with the insertion groove in an insertion manner. Three buckles (14) are arranged on the inner wall of the accommodating cavity (11) and located at positions respectively corresponding to angles of 0°, 120°, and 240°. Clamping blocks (22) corresponding to the buckles (14) are arranged on the outer wall of the middle race (2), and the clamping blocks (22) are clamped onto the buckles (14), such that the housing (1) and the middle race (2) are fixed together. Such configuration has the following beneficial effects: The overall structure is compact, thus saving space. During assembly, the retainer (4) and the ball (41) are mounted onto the middle race (2), and then the middle race (2) is sleeved outside the inner race (3), such that the middle race (2) and the inner race (3) are rotatably connected. Afterward, based on the match between the guide protrusion (12) and the insertion groove, the middle race (2) is put into the accommodating cavity (11) of the housing (1), and in this process, the clamping block (22) is clamped in the buckle (14), such that the middle race (2) is fixed to the housing (1). In this way, the ease of assembly and simplification of the assembly procedure are achieved. Meanwhile, the whole bearing except for the ball (41) is made of plastic, such that lightweight parts are realized. Being almost completely made of plastic, the whole bearing can be self-lubricated without excessive lubricating oil, thus reducing costs and pollution to the environment. The plastic can be processed by injection molding, such that high processing efficiency is achieved, and the grinding process can be replaced. Additionally, the structure is simple and can be easily assembled, and the assembly efficiency of the overall structure is improved.

Further, a convex block (15) is arranged on a side of the buckle (14) that is facing the clamping block (22). A surface of the convex block (15) that is brought into contact with the clamping block (22) is inclined, and a surface of the clamping block (22) that is brought into contact with an outer edge of the accommodating cavity (11) is inclined. Such configuration has the following beneficial effects: The clamping block (22) is clamped into the buckle (14) more smoothly, such that the assembly efficiency is improved.

Further, positioning ribs (13) corresponding to two sides of the positioning protrusions (21) are arranged on the inner wall of the accommodating cavity (11). The positioning rib (13) and the positioning protrusion (21) are both formed in a wedge shape, and an outer wall of the positioning rib (13) is attached to an outer wall of the positioning protrusion (21). Such configuration has the following beneficial effects: A better assembly guidance effect is achieved, and the structure is simple and extremely stable.

Further, a positioning flange (17) is arranged on the bottom surface of the accommodating cavity (11). A dust-proof groove (32) corresponding to the positioning flange (17) is formed in an end face of the inner race (3). The positioning flange (17) is clamped into the dust-proof groove (32). Further, the positioning flange (17) is in a clearance fit with the dust-proof groove (32). Such configuration has the following beneficial effects: A labyrinth structure is formed by the combination of the dust-proof groove (32) and the positioning flange (17), such that foreign matters are prevented from falling into the bearing, and the stability in the use of the overall structure is achieved. Meanwhile, the structure is simple and can be easily assembled, and the weight of the overall structure is effectively reduced, such that the requirement for a lightweight structure is met. Additionally, based on the clearance fit between the positioning flange (17) and the dust-proof groove (32), the positioning flange (17) is clamped into the dust-proof groove (32) more easily, such that the assembly is smoother and more convenient.

Further, a plurality of assembly ribs (16) is circumferentially arranged on an outer wall of the housing (1), and a guide rib (18) for assembly guidance is also arranged on the outer wall of the housing (1). Such configuration has the following beneficial effects: By using the assembly ribs (16), a pressing force applied to the housing is not likely to be excessively large. Meanwhile, the structure is simple and can be easily assembled, and the convenience of production and processing is achieved.

Further, an inner radial surface of the inner race (3) is special-shaped. Such configuration has the following beneficial effects: The pressing force from a shaft is not likely to be excessively large, such that the stability and use effect of the overall structure are guaranteed. Meanwhile, the structure is simple, and the convenience for the processing is achieved.

As shown in FIG. 1 to FIG. 3, a plastic bearing for a steering column in embodiment 3 of the present disclosure includes a housing (1), an inner race (3), and a middle race (2), where the middle race (2) is sleeved outside the inner race (3). A retainer (4) and balls (41) rotatably mounted on the retainer (4) are arranged between the middle race (2) and the inner race (3). The housing (1), the inner race (3), and the middle race (2) are all made of plastic. An accommodating cavity (11) is formed in the housing (1). The middle race (2) is arranged in the accommodating cavity (11). Guide protrusions (12) are arranged on an inner wall of the accommodating cavity (11). Two positioning protrusions (21) corresponding to two sides of each guide protrusion (12) are arranged on an outer wall of the middle race (2), and an insertion groove is formed between the two positioning protrusions (21). The guide protrusion (12) is matched with the insertion groove in an insertion manner. Four buckles (14) are arranged on the inner wall of the accommodating cavity (11) and located at positions respectively corresponding to angles of 0°, 90°, 180°, and 270°. The guide protrusions (12) are correspondingly arranged on two sides of each buckle (14). Clamping blocks (22) corresponding to the buckles (14) are arranged on the outer wall of the middle race (2), and the clamping blocks (22) are clamped onto the buckles (14), such that the housing (1) and the middle race (2) are fixed together. Such configuration has the following beneficial effects: The overall structure is compact, thus saving space. During assembly, the retainer (4) and the ball (41) are mounted onto the middle race (2), and then the middle race (2) is sleeved outside the inner race (3), such that the middle race (2) and the inner race (3) are rotatably connected. Afterward, based on the match between the guide protrusion (12) and the insertion groove, the middle race (2) is put into the accommodating cavity (11) of the housing (1), and in this process, the clamping block (22) is clamped onto the buckle (14), such that the middle race (2) is fixed to the housing (1). In this way, the ease of assembly and simplification of the assembly procedure are achieved. Meanwhile, the whole bearing except for the ball (41) is made of plastic, such that a lightweight bearing is realized. Being almost completely made of plastic, the whole bearing can be self-lubricated without excessive lubricating oil, thus reducing costs and pollution to the environment. The plastics can be processed by injection molding so that high processing efficiency is achieved, and the grinding processing can be replaced. Besides, the structure is simple and can be easily assembled, and the assembly efficiency of the overall structure is improved.

Further, a convex block (15) is arranged on a side of the buckle (14) that is facing the clamping block (22). A surface of the convex block (15) that is brought into contact with the clamping block (22) is inclined. A surface of the clamping block (22) that is brought into contact with an outer edge of the accommodating cavity (11) is inclined. Such configuration has the following beneficial effects: The clamping block (22) is clamped into the buckle (14) more smoothly, such that the assembly efficiency is improved.

Further, positioning ribs (13) corresponding to two sides of the positioning protrusions (21) are arranged on the inner wall of the accommodating cavity (11); the positioning rib (13) and the positioning protrusion (21) are both formed in a wedge shape, and an outer wall of the positioning rib (13) is attached to an outer wall of the positioning protrusion (21). Such configuration has the following beneficial effects: A better assembly guidance effect is achieved, and the structure is simple and extremely stable.

Further, a positioning flange (17) is arranged on the bottom surface of the accommodating cavity (11); a dust-proof groove (32) corresponding to the positioning flange (17) is formed in an end face of the inner race (3), and the positioning flange (17) is clamped in the dust-proof groove (32). Further, the positioning flange (17) is in a clearance fit with the dust-proof groove (32). Such configuration has the following beneficial effects: A labyrinth structure is formed by the combination of the dust-proof groove (32) and the positioning flange (17), such that foreign matters are prevented from falling into the bearing, and the stability in the use of the overall structure is achieved. Meanwhile, the structure is simple and can be easily assembled, and the weight of the overall structure is effectively reduced, such that the requirement for a lightweight structure is met. Besides, based on the clearance fit between the positioning flange (17) and the dust-proof groove (32), the positioning flange (17) is clamped into the dust-proof groove (32) more easily, such that the assembly is smoother and more convenient.

Further, a plurality of assembly ribs (16) are circumferentially arranged on an outer wall of the housing (1), and a guide rib (18) for assembly guidance is also arranged on the outer wall of the housing (1). Such configuration has the following beneficial effects: By using the assembly ribs (16), a pressing force applied to the housing is not likely to be excessively large. Meanwhile, the structure is simple and can be easily assembled, and the convenience of production and processing is achieved.

Further, an inner radial surface of the inner race (3) is special-shaped. Such configuration has the following beneficial effects: The pressing force from a shaft is not likely to be excessively large, such that the stability and use effect of the overall structure are realized. Meanwhile, the structure is simple, and the convenience of processing is achieved.

The above embodiment is just one of the preferred specific embodiments of the present disclosure, and ordinary variations and substitutions made by those skilled in the art within the scope of the technical solution of the present disclosure shall fall within the protection scope of the present disclosure.

What is claimed is:

1. A plastic bearing for a steering column comprising:
a housing,
an inner race, and
a middle race,
wherein the middle race is sleeved outside the inner race;
wherein a retainer and balls are arranged between the middle race and the inner race, and the balls are rotatably mounted on the retainer;
wherein the housing, the inner race, and the middle race are made of plastic;
wherein an accommodating cavity is in the housing; the middle race is arranged in the accommodating cavity; and a plurality of guide protrusions are arranged on an inner wall of the accommodating cavity;
wherein two positioning protrusions are arranged on an outer wall of the middle race, and the two positioning protrusions correspond to two sides of each of the plurality of guide protrusions;
wherein an insertion groove is between the two positioning protrusions; each of the plurality of guide protrusions is matched with the insertion groove in an insertion manner;
wherein a plurality of buckles are arranged on the inner wall of the accommodating cavity; clamping blocks are arranged on the outer wall of the middle race, and the clamping blocks correspond to the plurality of buckles; and
wherein the clamping blocks are clamped in the plurality of buckles to fix the housing and the middle race together.

2. The plastic bearing for the steering column according to claim 1, wherein a side of each of the plurality of buckles faces the clamping blocks, and a convex block is arranged on the side.

3. The plastic bearing for the steering column according to claim 2, further comprising positioning ribs,
wherein the positioning ribs are arranged on the inner wall of the accommodating cavity, and the positioning ribs correspond to each side of the two positioning protrusions, so that there are two positioning ribs for each of the two positioning protrusions.

4. The plastic bearing for the steering column according to claim 3, wherein the positioning ribs and the two positioning protrusions are in a wedge shape.

5. The plastic bearing for the steering column according to claim 4, wherein an outer wall of the positioning ribs is attached to an outer wall of the two positioning protrusions.

6. The plastic bearing for the steering column according to claim 5, further comprising a positioning flange and a dust-proof groove,
wherein the positioning flange is arranged on a bottom surface of the accommodating cavity,
wherein the dust-proof groove is arranged on an end face of the inner race, and the dust-proof groove corresponds to the positioning flange, and
wherein the positioning flange is clamped in the dust-proof groove.

7. The plastic bearing for the steering column according to claim 6, wherein the positioning flange is in a clearance fit with the dust-proof groove.

8. The plastic bearing for the steering column according to claim 2, wherein the convex block is in contact with each of the clamping blocks, and a contact surface of the convex block and each of the clamping blocks is inclined, each of the clamping blocks is in contact with an outer edge of the accommodating cavity, and a contact surface of the clamping block and the outer edge is inclined.

9. The plastic bearing for the steering column according to claim 8, further comprising positioning ribs,
wherein the positioning ribs are arranged on the inner wall of the accommodating cavity, and the positioning ribs correspond to each side of the two positioning protrusions, so that there are two positioning ribs for each of the two positioning protrusions.

10. The plastic bearing for the steering column according to claim 9, wherein the positioning ribs and the two positioning protrusions are in a wedge shape.

11. The plastic bearing for the steering column according to claim 10, wherein an outer wall of the positioning ribs is attached to an outer wall of the two positioning protrusions.

12. The plastic bearing for the steering column according to claim 11, further comprising a positioning flange and a dust-proof groove,
wherein the positioning flange is arranged on a bottom surface of the accommodating cavity,
wherein the dust-proof groove is arranged on an end face of the inner race, and the dust-proof groove corresponds to the positioning flange, and
wherein the positioning flange is clamped in the dust-proof groove.

13. The plastic bearing for the steering column according to claim 12, wherein the positioning flange is in a clearance fit with the dust-proof groove.

14. The plastic bearing for the steering column according to claim 1, further comprising positioning ribs,
wherein the positioning ribs are arranged on the inner wall of the accommodating cavity, and the positioning ribs correspond to each side of the two positioning protrusions, so that there are two positioning ribs for each of the two positioning protrusions.

15. The plastic bearing for the steering column according to claim 14, wherein the positioning ribs and the two positioning protrusions are in a wedge shape.

16. The plastic bearing for the steering column according to claim 15, wherein an outer wall of the positioning ribs is attached to an outer wall of the two positioning protrusions.

17. The plastic bearing for the steering column according to claim 16, further comprising a positioning flange and a dust-proof groove,
wherein the positioning flange is arranged on a bottom surface of the accommodating cavity,
wherein the dust-proof groove is arranged on an end face of the inner race, and the dust-proof groove corresponds to the positioning flange, and
wherein the positioning flange is clamped in the dust-proof groove.

18. The plastic bearing for the steering column according to claim 17, wherein the positioning flange is in a clearance fit with the dust-proof groove.

19. The plastic bearing for the steering column according to claim 1, furthering comprising a plurality of assembly ribs and a guide rib,
wherein the plurality of assembly ribs are circumferentially arranged on an outer wall of the housing, and
wherein the guide rib is configured for assembly guidance and is arranged on the outer wall of the housing.

20. The plastic bearing for the steering column according to claim 1, wherein an inner radial surface of the inner race is cog-shaped.

* * * * *